July 9, 1963

L. F. STRINGER 3,096,670

APPARATUS AND METHOD FOR WORKPIECE THICKNESS CONTROL

Filed July 16, 1957

L. F. STRINGER 3,096,670

APPARATUS AND METHOD FOR WORKPIECE THICKNESS CONTROL

Filed July 16, 1957

INVENTOR
Loren L. Stringer
BY
ATTORNEY

United States Patent Office 3,096,670
Patented July 9, 1963

3,096,670
APPARATUS AND METHOD FOR WORKPIECE THICKNESS CONTROL
Loren F. Stringer, Amherst, N.Y., assignor to Westinghouse Electric Corporation, East Pittsburgh, Pa., a corporation of Pennsylvania
Filed July 16, 1957, Ser. No. 672,319
9 Claims. (Cl. 80—56)

The present invention relates, in general, to the apparatus and method for controlling a predetermined parameter of a workpiece, and more particularly relates to control apparatus and the method to be utilized for controlling a parameter such as the thickness or gauge of a moving strip of material, such as metal, by varying the spacing between a pair of work members such as roller members operative with said strip.

It is an object of the present invention to provide improved workpiece parameter control apparatus and operative method to vary a predetermined parameter of a workpiece in accordance with known previous parameter errors or deviations relative to a predetermined reference value of said parameter, and known previous corrections made in said parameter.

It is another object of the present invention to provide an improved control apparatus and operative method of controlling a parameter such as the thickness of a workpiece or strip of material in accordance with previous errors in said parameter relative to a reference value for said parameter, and in accordance with at least one previous correction of said parameter.

It is a different object of the present invention to provide an improved apparatus and operative method for controlling the thickness of a strip of material in accordance with a first strip thickness measurement, a change made in the strip thickness proportional to said first thickness measurement, and a second strip thickness measurement made a predetermined time interval after said first thickness measurement as determined by the movement speed of said strip.

It is an additional object of the present invention to provide an improved apparatus and operative method for maintaining the thickness of gauge of a moving strip of material substantially constant in accordance with a predetermined relationship between a measured strip thickness error relative to a reference strip thickness, a previous strip thickness correction and an earlier measured strip thickness error relative to said reference strip thickness.

These and other objects and advantages of the present invention will become apparent in view of the following description taken in conjunction with the drawings, wherein.

Figure 1:
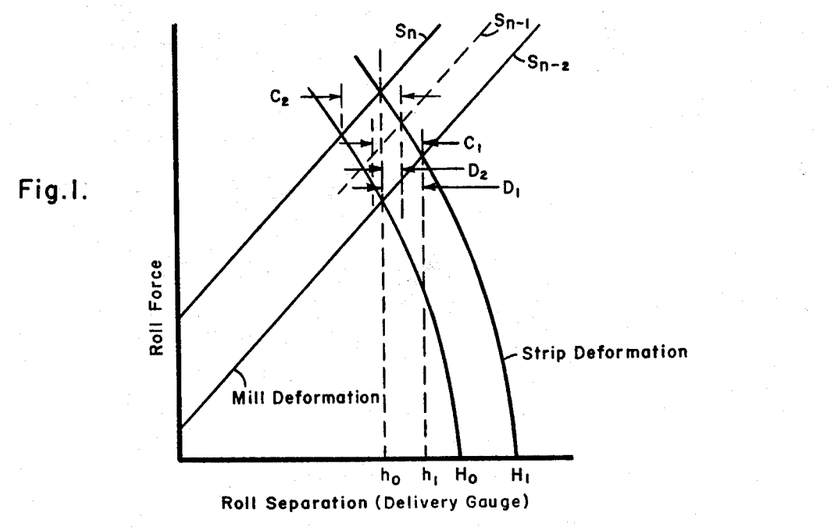
FIGURE 1 shows a curve chart illustrating the well-known rolling mill and strip deformation curves.

In FIG. 1 the well-known rolling mill deformation and strip deformation curves are shown, with the values of strip delivery gauge and roll force under a given set of operating conditions given by the intersection of the appropriate pair of curves. If, for example, the predetermined desired reference strip thickness or gauge is $h_0$ and the rolling mill operation is in accordance with deformation curve is $S_{n-2}$, the strip deformation curve will be $H_0$ when the strip is delivered from the mill on gauge, or having a thickness corresponding to the predetermined desired strip thickness $h_0$. After a predetermined time interval, suppose that the rolling conditions change such that the strip deformation curve becomes that denoted $H_1$. For this condition of operation, the thickness of the strip would be $h_1$ and there would be an error in the strip thickness of $D_1$, as shown in FIG. 1. If the spacing between the roller members operative with the strip is changed or corrected by an amount proportional to the latter thickness error $D_1$, suppose the spacing is changed by an amount $C_1$, as shown in FIG. 1, this will establish a new mill deformation curve denoted by $S_{n-1}$ and a new thickness error denoted by $D_2$ relative to the predetermined desired strip thickness $h_0$. From a study of the curve chart shown in FIG. 1, it will be seen that a correction or change in the screwdown setting or spacing between the roller members substantially equal to amount $C_2$, as shown in FIG. 1, is required to bring the strip back on gauge. If the changes in the screwdown setting or the spacing between the roller members are relatively small, the arc of the strip deformation curves between the points of intersection with the mill deformation curves will be very nearly linear and hence by a consideration of similar triangles we can determine the value of the quantity $$C_2 = \left(\frac{D_2}{D_1 - D_2}\right) C_1$$

The above method of strip thickness control may thusly be repeated as controlled by a cycling or sequencing operation, if desired, at time intervals dependent upon the operational speed of the rolling mill and the moving speed of the strip, such that a deviation of the strip thickness relative to a predetermined reference thickness is determined and used to make a correction in the strip thickness or the spacing between the roller members of the rolling mill proportional to that deviation, and the result or a subsequent deviation is then measured. A calculation in accordance with the above relationship of these quantities may then be made to determine the necessary subsequent correction to provide on-gauge or proper thickness strip. Thusly, this subsequent correction is made in accordance with the initial deviation, the correction made and the subsequent deviation.

In this regard, the initial measured deviation $D_1$ may be made proportional to the first correction $C_1$ in accordance with the following relationship $C_1 = (A)D_1$, and by a suitable empirical adjustment of the factor A, which is by no means critical, the amount of off-gauge strip may be substantially reduced or eliminated.

The factor A may be determined in the following manner. If $S_1$ is the average slope of the strip deformation curve $H_1$, and $S_2$ is the average slope of the mill deformation curve $S_{n-2}$, then $(D_1)S_1$ would be the average increase needed in the roll force to get back on gauge in order to compensate for the initial deviation $D_1$, and $(C_1-D_1)S_2$ would be the average increase needed in the roll force obtained by changing the screws or the relative spacing between the roller members 12 and 14 by an amount $C_1$. Thusly, from the following equation $$(C_1 - D_1)S_2 = (D_1)S_1$$

it can be determined that $$C_1 = D_1\left(\frac{S_1 + S_2}{S_2}\right)$$

and on the average, $$\text{factor } A = \left(\frac{S_1+S_2}{S_2}\right)$$

Since it is preferable that the first correction $C_1$ be less than required for a full correction, the factor $A$ should be less than $$\left(\frac{S_1+S_2}{S_2}\right)$$

In this regard the quantity $S_1$ may be chosen as the minimum slope for all strip deformation curves in the operating range.

Figure 2:
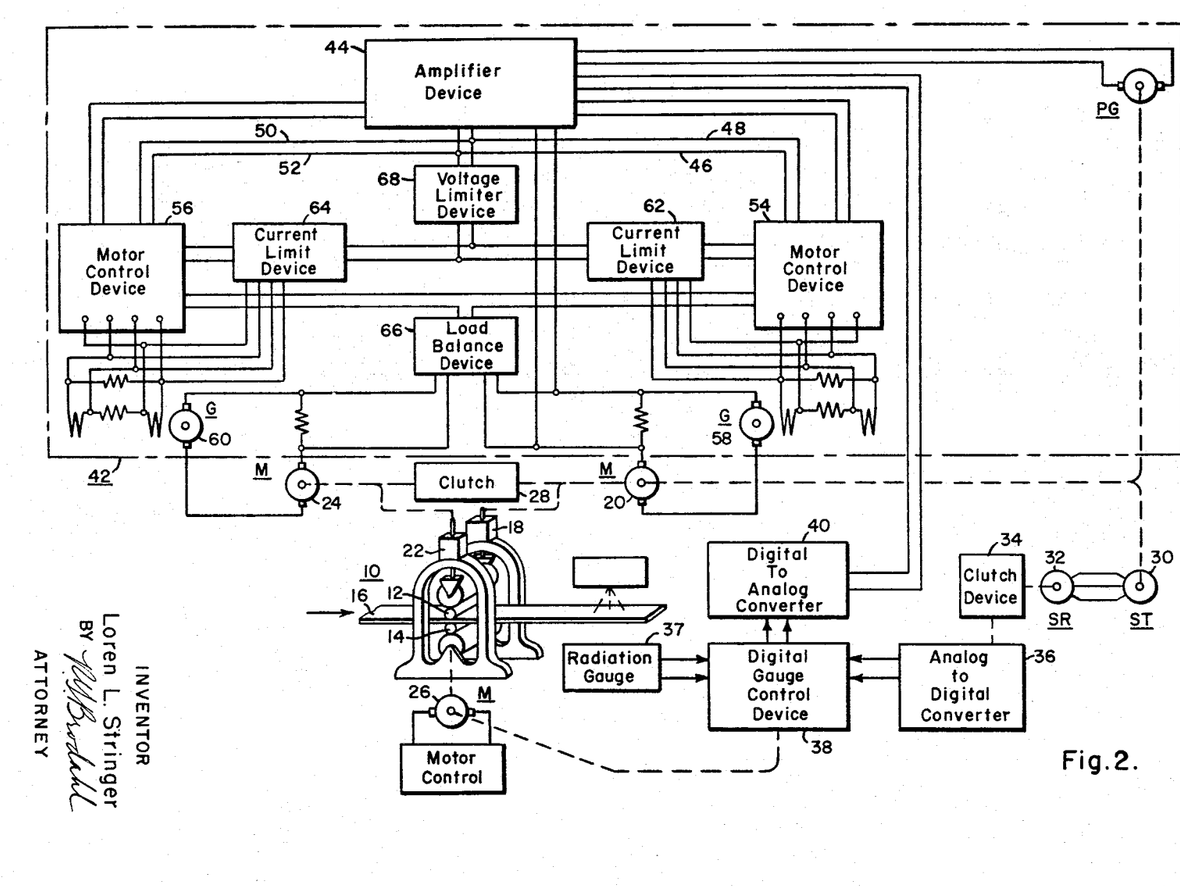
FIG. 2 is a schematic showing of the control apparatus in accordance with the present invention.

The control apparatus as shown in FIG. 2 is operative to perform the above-described operation, and in order to improve the accuracy in computation and strip thickness correction, a digital form of control apparatus has been provided. The control apparatus as shown in FIG. 2 is merely illustrative and it should be understood by person skilled in this art that the requisite number of parallel binary digit circuits will be provided for the required number of digits in accordance with the desired accuracy of strip thickness control.

A strip rolling mill 10 including an upper roller member 12 and a lower roller member 14 is operative with a strip 16 for controlling the thickness or gauge of said strip. A first screwdown control device 18 is operative with a first screwdown motor 20 and a second screwdown device 22 is operative with a second screwdown control motor 24 for controlling the spacing between the roller members 12 and 14 as well known to persons skilled in this art. A mill motor 26 is operative with the roller members 12 and 14 for controlling the operational speed of the mill 10. The mill motor 20 is operatively connected to the mill motor 24 through a clutch device 28 as well known to persons skilled in this art.

The screwdown setting or the spacing between the roller members 12 and 14 is sensed through a connection provided between the screwdown motor 20 and a synchro transmitting device 30 connected to a synchro receiving device 32 and through a clutch device 34 to an analog-to-digital converter 36, such that a digital output signal is provided by the analog-to-digital converter 36 in accordance with the screwdown setting or spacing between the roller members 12 and 14. The mill motor 26 is operatively connected to a digital gauge control device 38 for controlling the operation of the digital gauge control device 38 in accordance with the operative speed of the rolling mill 10 and the movement speed of the strip 16, as will be later described relative to the control apparatus shown in FIG. 3. The digital control signal received from the analog-to-digital converter device 36 is also supplied to the digital gauge control device 38. An output control signal is provided in digital form to a digital-to-analog converter device 40 for correcting the screwdown setting or spacing between the roller members 12 and 14 as necessary to provide on-gauge strip or to provide the strip 16 with the predetermined and desired thickness as will be explained.

A radiation type of strip thickness sensing gauge 37 is connected to the digital gauge control device 38 for providing a control signal in accordance with the error or deviation of the actual thickness of the strip 16 ralative to a predetermined desired thickness.

The output control signal from the digital-to-analog converter 40 is supplied to a variable voltage motor control device 42, including an amplifier device 44, which receives the strip thickness correction signal and supplied it through conductors 46 and 48 and 50 and 52 to respectively the motor control device 54 for the screwdown motor 20 and the motor control device 56 for the screwdown motor 24. The motor control devices are respectively connected to a well known generator field bridge circuit for controlling the output voltage of the respective generators 58 and 60 which, in turn, control the operation of the respective screwdown motors 20 and 24. The well known current limiter devices 62 and 64 are provided as is a load balance device 66 and a voltage limiter device 68. In this regard, a suitable variable voltage motor control as shown in FIG. 2, is more fully disclosed and described in copending application Serial No. 662,479, filed May 29, 1957, by J. W. Wallace, R. E. Hull and R. W. Moore, and assigned to the same assignee as the present application.

Figure 3:
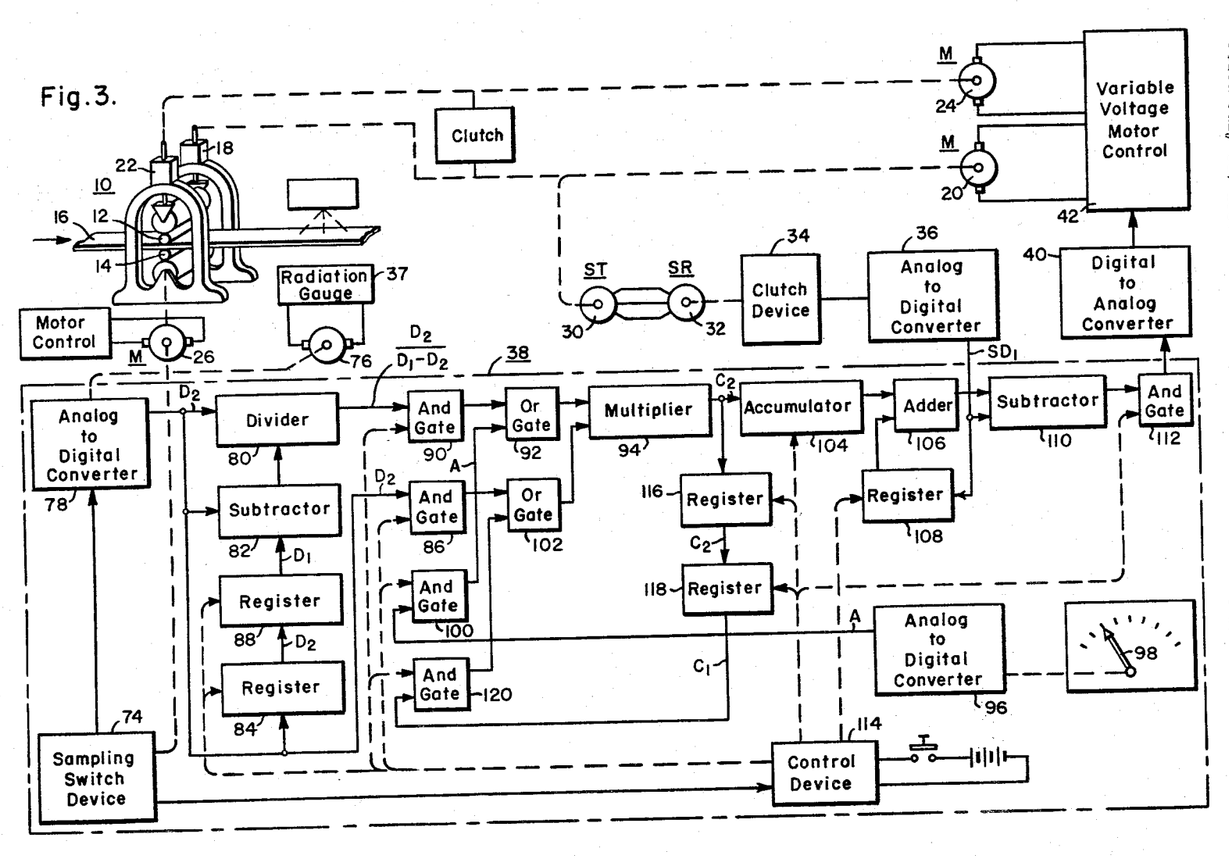
FIG. 3 is a schematic showing of the control apparatus in accordance with the present invention, showing the digital gauge control device in greater detail.

In FIG. 3 the digital gauge control device 38 is shown in greater detail. The mill motor 26 is operative with a sampling device 74 for providing a sampling type of operation. The radiation gauge 37 is operative through its servo motor 76 for controlling the analog-to-digital converter 78 to provide a digital output signal corresponding to the deviation or error between the actual thickness of the strip 16 relative to a predetermined desired thickness. For one time period, this deviation may correspond to the quantity $D_1$. At the next interval of time, a second thickness deviation reading $D_2$ will be provided in the output of the analog-to-digit converter 78.

During a first time interval, the $D_1$ quantity is supplied by the analog-to-digital converter 78 to the AND gate 86 and the register 84, and it is then passed on through the OR gate 102 to the multiplier device 94, where this $D_1$ quantity is multiplied by a second quantity $A$ received from the analog-to-digital converter device 96 in accordance with the manual setting of a control arm 98. The quantity $A$ from the analog-to-digital converter 96 is supplied through the AND gate 100 to the OR gate 92 such that the quantity $A$ received through the OR gate 92 and the quantity $D_1$ received through the AND gate 86 and the OR gate 102 are multiplied together in the multiplier device 94 to provide the initial correction $C_1$, in accordance with the relationship $C_1=(A)D_1$, and which is supplied to an accumulator device 104. In this regard the control device 114 sequences the AND gate 86 with the AND gate 100, and sequences the AND gate 90 with the AND gate 120. The adder device 106 adds the initial screwdown position $SD_0$ as received from the register device 108 to this correction quantity $C_1$ and provides the quantity $(SD_0+C_1)$ as a reference setting to the subtractor device 110. The actual screwdown position $SD_1$ is supplied from the analog-to-digital converter 36 to the subtractor device 110, such that the difference between the desired screwdown setting represented by the quantity $(SD_0+C_1)$ and the actual screwdown setting $SD_1$ is supplied through the AND gate 112 to the digital-to-analog converter 40 for correcting the screwdown position or spacing between the roller members 12 and 14 in a direction and by an amount as necessary to effect the initial desired correction $C_1$.

During the next or second time interval as determined by the sampling switch device 74 and the control device 114, the deviation or thickness error $D_2$ is supplied by the radiation gauge 37 to the analog-to-digital converter 78 which, in turn, supplies this quantity $D_2$ to the divided device 80, to the subtractor device 82 and to the register device 84 and the AND gate 86. Feeding the quantity $D_2$ to the register 84 shifts the quantity $D_1$ to the register 88. The sampling switch device 74 is operative through the control device 114 to cause the register 88 to supply the quantity $D_1$ to the subtractor 82 which, in turn, supplies the quantity $(D_1-D_2)$ to the divider device 80, such that the divider provides an output signal corresponding to the quantity $$\left(\frac{D_2}{D_1-D_2}\right)$$

to the AND gate 90, the OR gate 92 and the multiplier 94. The register device 116 initially received the quantity $C_1$ during said first time interval or period from the multiplier device 94. Now by virtue of the operation of the control device 114, the register device 116 supplies this quantity $C_1$ to the register device 118 and receives the quantity $C_2$ from the multiplier 94. The quantity $C_1$ from the register 118 is supplied through the AND gate 120 and the OR gate 102 to the multiplier 94 such that the quantity $C_1$ is multiplied by the quantity $$\left(\frac{D_2}{D_1-D_2}\right)$$

to provide the quantity $C_2$ in accordance with the relationship $$C_2=\left(\frac{D_2}{D_1-D_2}\right)C_1$$

in the output of the multiplier 94. This quantity $C_2$ supplied to the register device 116, and also passes through the accumulator 104 as the quantity $(C_1+C_2)$ to the adder 106 where it is added to the initial screwdown position $SD_0$ still received from the register 108. The register 108 is sequenced by the control device 114 only to receive the initial screwdown setting $SD_0$, and thereafter supplies this quantity $SD_0$ to the adder device 106. The accumulator retains the successive corrections and provides an accumulated correction quantity to the adder 106. The combined quantity $C_1+C_2+SD_0$ is now provided as a reference to the subtractor 110, and compared with the now provided screwdown quantity $SD_2$ from the analog-to-digital converter device 36 for providing through the AND gate 112 the necessary thickness correction signal to the digital-to-analog converter device 40 for correcting the screwdown position or the strip thickness or spacing between the roller members 12 and 14 in accordance with the second correction quantity $C_2$.

The apparatus repeatedly operates in the above described manner to first provide an initial correction quantity $C_A$ as a predetermined proportional relationship $C_A=K(D_A)$ to an initial deviation quantity $D_A$ and then measures the resulting deviation $D_B$ and provides the correction quantity $C_B$ in accordance with the relationship $$C_B=\left(\frac{D_B}{D_A-D_B}\right)C_A$$

for correcting any error or deviation in the thickness of the strip 16 by varying the screwdown or spacing between the roller members 12 and 14 in accordance with the quantity $C_B$.

Figure 4:
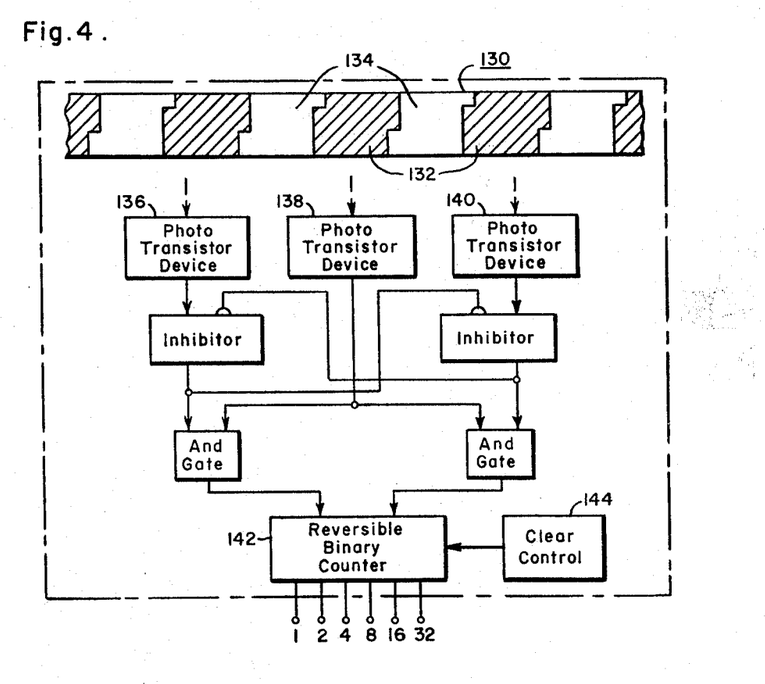
FIG. 4 is an illustrative showing of an analog-to-digital converter device suitable for use with the present invention.

In FIG. 4 there is shown one suitable form of a well known analog-to-digital converter device for use with the control apparatus of the present invention. A hollow drum member 130 is provided and has a suitable internal light source, and is rotated by the shaft whose position is being measured. The drum member has alternate opaque sections 132 and transparent sections 134. Three phototransistor devices 136, 138 and 140 are stationary with respect to axis of the drum member 130 and are used to detect the presence of a transparent section 134. With the shaft in the desired initial position, the reversible binary counter 142 is cleared by the clear control device 144 as well known to persons skilled in this art. Then as the drum 130 rotates and light is alternately applied to and removed from the phototransistor devices 136, 138 and 140, suitable pulses are thereby supplied to the binary counter 142. The apparatus as shown in FIG. 4 is believed to be well known to persons skilled in this art and is shown merely to provide an illustration of one suitable form of analog-to-digital converter apparatus for use with the present invention.

Figure 5:
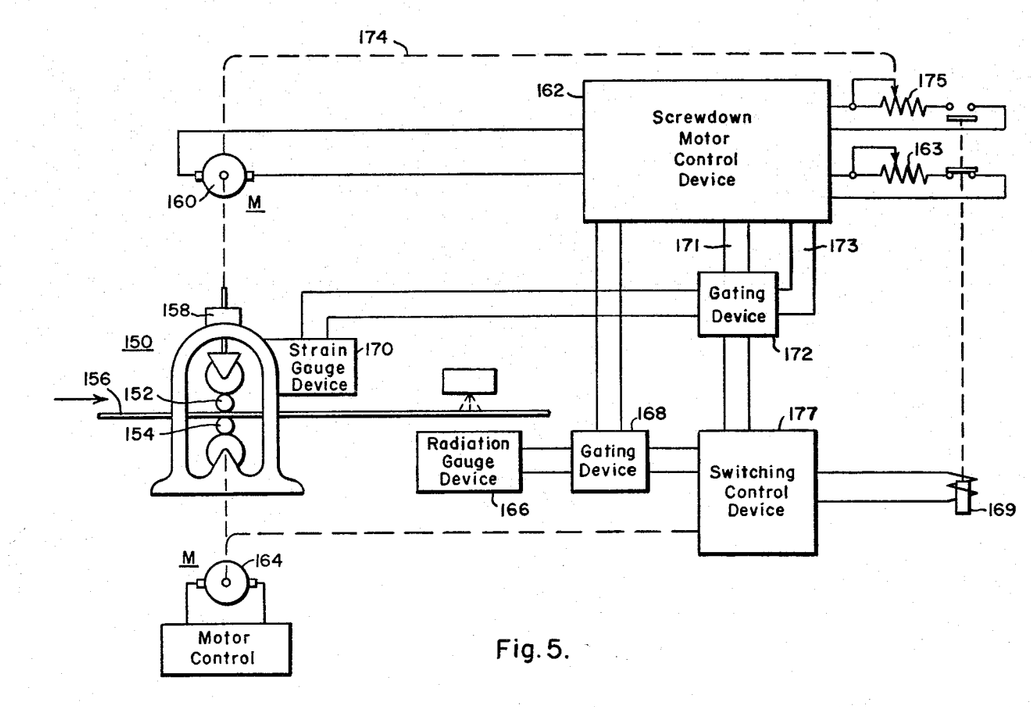
FIG. 5 is a diagrammatic showing of other suitable apparatus for performing the operative method of the subject invention.
Figure 6:
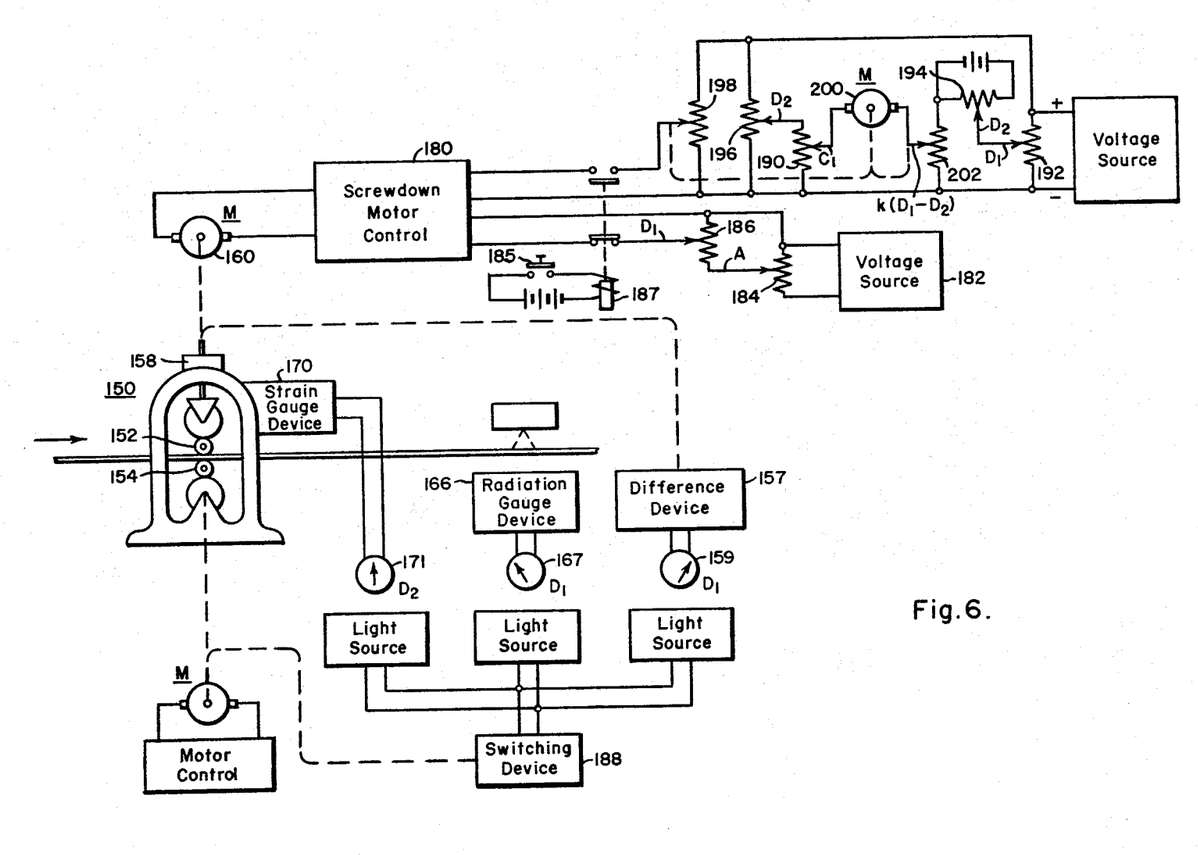
FIG. 6 is a diagrammatic showing of still other suitable apparatus for effecting manual control of the strip thickness in accordance with the operative method of the present invention.

In FIG. 5 there is shown another form of apparatus suitable for performing the method in accordance with the present invention. In FIG. 5 there is shown a rolling mill 150 including an upper roller member 152 and a lower roller member 154 operative with a strip 156 for controlling the thickness of said strip. A conventional screwdown control device 158 is operative with a screwdown motor 160 as determined by a screwdown motor control device 162 for controlling the spacing between the roller members 152 and 154. A motor 164 is operative with the roller members 152 and 154 for controlling the operative speed of the rolling mill 150 relative to the strip 156. A strain gauge device 170 is operative to provide the initial thickness error signal or initial deviaton $D_1$ through a first output 171 of a gating device 172 as determined by a switching control device 177 in accordance with the operative speed of the mill motor 164, and provides this thickness error signal $D_1$ to a first control winding of an input magnetic amplifier device in the screwdown motor control device 162. The latter control winding is also operative with an adjustable potentiometer 163 for providing a control function in accordance with the factor A previously discussed. After a time interval dependent upon strip speed the strain gauge 170 is operative to provide the resulting thickness error signal in accordance with a second thickness error or deviation $D_2$ through a second output 173 of the gating device 172 to a second control winding of the screwdown motor control device 162. The correction $C_1$ made in the setting of the screwdown device 158 or the spacing between the roller members 152 and 154 is sensed through a connection 174 between the screwdown device 158 and an adjustable potentiometer 175 operative with said second control winding and connected to sense corrections made in the setting of the screwdown device 158 and operative with the screwdown motor control device 162. Thusly, with the apparatus as shown in FIG. 5, the roller members 152 and 154 are operative to determine the thickness of a given portion of the strip 156 and the strain gauge 170 is opeartive to provide a thickness error signal $D_1$ and to correct the screwdown setting of the screwdown device 158 by a first amount $C_1$ which is proportional to the first deviation $D_1$ in accordance with the relationship $C_1=(A)\times D_1$, with the switch device 169 in its illustrated position, the constant A may be provided by so adjusting the impedance device 163 operative with said first control winding of an input magnetic amplifier device within the screwdown motor control device 162. In this regard the screwdown motor control device as shown in FIG. 2 would be suitable, and a control winding of the input magnetic amplifier device 44 may be operative with the impedance device 163 and a suitable voltage source for energizing this winding. Then the strain gauge 170 is operative to detect the resulting thickness error $D_2$ by sensing after a time interval the thickness of a subsequent portion of the strip 156 relative to a predetermined reference thickness, and in accordance with the strain set up in the mill housing due to the operation of the roller members 152 and 154 relative to the strip 156. This operation of a strain gauge is well known to persons skilled in this art. The strain gauge 170 provides the thickness error signal $D_2$ which is passed through the output 173 of the gating device 172, and along with the initial deviation signal $D_1$ now provided by the radiation gauge 166 through the gating device 168; further with the switch device 169 energized by the control device 177 the first correction $C_1$ is sensed through the connection 174 operative with the position sensing device 175 and the second control winding within the screwdown motor control device 162 in accordance with the predetermined relationship $$\left(\frac{D_2}{D_1-D_2}\right)\times C_1$$

for determining the amount of correction $C_2$ to be subsequently made through the motor 160 and the screwdown device 158 for providing a predetermined desired thickness to the strip 156. The circuit arrangement for the latter calculation will be described relative to FIG. 6. If desired, as a modification of the apparatus shown in FIG. 5, a second radiation gauge may be provided and spaced away from the first radiation gauge 166 in the direction of strip travel in distance that may be adjustable depending upon the movement speed of the strip, such that during the first time interval the radiation gauge 166 is operative to provide the first error or deviation $D_1$, and then during a second time interval the radiation gauge 166 would provide the second deviation signal $D_2$ and the above second radiation gauge would provide the first deviation $D_1$ to the screwdown motor control device 162.

In FIG. 6 there is shown an additional suitable apparatus for performing the operative method in accordance with the present invention, with the apparatus shown in FIG. 6 being manually operated. In FIG. 6 there is shown the rolling mill 150 including the upper roller member 152 and the lower roller member 154, the strain gauge 170 and the radiation gauge 166. During a first time interval the strain gauge 170 is operative with a visual meter device 171 to provide a signal corresponding to the first deviation $D_1$. The potentiometer 186 can then be adjusted in accordance with the initial deviation $D_1$, and the potentiometer 184 may be adjusted in accordance with the factor A. With the contact device 187 in its illustrated position as controlled by the switch device 185, the first correction $C_1$ is effected. Then during a successive time interval the radiation gauge 166 is operative with a visual meter device 167 for providing a visual indication of the valve of the first deviation $D_1$. The strain gauge 170 is operative with a second meter device 171 for providing a visual indication of the second deviation or thickness error $D_2$. The screwdown device 158 is operative with a position difference device 157 and a meter 159 for providing a visual indication of the first correction quantity $C_1$. The difference device 157 may include a manual zero position setting if desired for adjustment just prior to sensing the first correction $C_1$.

The screwdown motor 160 is controlled during said first time interval by the screwdown motor control 180 operative with a first voltage source 182 and the first potentiometer 184 and a second potentiometer 186 such that the first correction quantity $C_1$ is provided to an input magnetic amplifier control winding in accordance with the relationship $C_1 = (A) \times D_1$. This causes the screwdown motor control 180 to operate the screwdown motor 160 and the screwdown device 158 in a direction and an amount for effecting the first correction $C_1$ in the spacing between the roller members 152 and 154 and in the thickness of the strip 156. The desired timing relationship may be obtained by flashing light source adjacent the respective meter devices 159, 167 and 171 by a switching device 188 operatively connected with the mill motor 164 for controlling the flashes of the light sources as a function of the operative speed of the rolling mill 150 and the movement speed of the strip 156.

The first deviation $D_1$ may be manually applied by adjusting the contact arm of the potentiometer 186 in accordance with the value of the first deviation $D_1$. The adjustment of the potentiometer device 184 could have previously been made in accordance with the empirically determined constant A, which constant A is determined by a stud of the rolling mill and strip deformation curves as shown in FIG. 1 and as previously explained. The first screwdown correction $C_1$ is thereby provided. Subsequently, and after the effect of the first screwdown correction has reached the radiation gauge 166, the light sources are again flashed and this time the meter 159 reads the quantity $C_1$ and the radiation gauge 166 and its meter 167 reads the first deviation quantity $D_1$ and the strain gauge 170 now provides the second deviation quantity $D_2$. The manual operator can now adjust the potentiometer 190 in accordance with the value $C_1$, adjust the potentiometer 192 in accordance with the value $D_1$ and adjust the potentiometer devices 194 and 196 in accordance with the quantity $D_2$ and close the switch member 185 to thereby provide the subsequent control signal $C_2$ from across the potentiometer 198 to the screwdown motor control in accordance with the predetermined relationship $$\left(\frac{D_2}{D_1 - D_2}\right) \times C_1$$

and in this way, a manual control of the strip thickness may be effected in accordance with the operative method of the present invention.

The latter circuit arrangement as shown in FIG. 6 and including the motor 200 is operative such that said motor 200 will adjust the position of the contact arm on potentiometer 202 until the voltage difference across the motor 200 is zero. In this manner the contact arm on the potentiometer 198 is also adjusted to provide an output signal $C_2$ in accordance with $$C_2 = C_1 \left(\frac{D_2}{D_1 - D_2}\right)$$

It should be here noted that for particularly slow operating speeds of the rolling mill 150 the latter manually operative control apparatus would be very practical.

Thusly, it is seen that the deviations of the strip thickness from a reference value as sampled at intervals proportional to the operative speed of the rolling mill, and of such duration as to permit the results of any change in screwdown setting to be fully obtained, is utilized to change the screwdown setting by an amount which is a function of the initial deviation sample. Then by noting the resulting or subsequent deviation and in accordance with the above described predetermined relationship, a second correction can be made to the strip thickness in accordance with the initial deviation, the initial correction and the subsequent deviation resulting after the initial correction is made. In this manner, the strip thickness may be brought back to the predetermined desired thickness or on-gauge condition. This manner of operation may be continuously repeated as desired or may occur at predetermined successive but spaced time intervals as may be desired.

The various operational devices, shown in FIG. 3, such as the adder device, the subtractor device, the multiplier device and the divider device are believed to per se be well known to persons skilled in this art, and are operative to generate on their respective outputs the number which represents the sum, difference, product and quotient, respectively, of the numbers applied to their inputs. Each register device is operative to generate on its output the number applied to its input upon receipt of a command pulse from the control device 114. The accumulator device is the combination of an adder and a register. Upon receipt of a command pulse, the number applied to its input is added to the number registered on its output and the sum is registered. The AND gate permits the transmission of a number only when a command signal is provided to each of its inputs. The OR gate permits the transmission of any signal applied to its inputs.

The analog-to-digital converted device 78 may be coupled directly to the instrument servo of the radiation gauge and such an arrangement is believed to be well known to persons skilled in this art. The analog-to-digital converter device 78 produces an output only when its read-out solenoid is energized by the sampling switch device 74. Although, the input shaft is free to turn during read-out, the number read-out represents the shaft position at the time read-out is initiated. The device is therefore well suited for sampling purposes. Sampling can be controlled by means of a rotary switch, such as the sampling switch device 74, coupled to the mill motor 26. The period of operation of the switch device 74 is proportional of strip speed and permits the effect of a given correction in screw setting to be measured before initiating another correction. The analog-to-digital converter used for measuring changes in screwdown position 36 must generate a number representing screwdown position continuously within its accuracy limits. Such a device is available and well known to persons skilled in this art. Since the present control apparatus is interested primarily in changes in the screw position from some initial value $SD_0$, it is necessary that this initial reading $SD_0$ be subtracted out and this is accomplished by means of the adder device 106 and the register 108. The initial setting can be obtained automatically at the end of a coil by clearing the output of the accumulator device 38.

With the apparatus shown in FIG. 4, when the drum 130 is in the desired initial position, the reversible binary counter is cleared. Then as the drum 130 rotates, and light is alternately applied to and removed from the phototransistors 136, 138 and 140, control pulses are supplied to the binary counter 142. By this means the register and adder shown in FIG. 3 are not needed.

The control apparatus as shown in FIGS. 2 and 3 is operative as a position regulator having a reference quantity that is supplied in digital form. The change in the reference quantity is initiated by the sampling switch and controlled by the radiation gauge. The control circuits control the sequencing of the computer functions as required and well known to persons skilled in this art.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. The method of controlling the thickness of a moving strip of material by changing the spacing between a pair of roller members operative with said strip, including the steps of measuring a first deviation $D_1$ in the thickness of said strip relative to a predetermined reference thickness, making a first correction $C_1$ in the spacing between said roller members proportional to said first deviation, measuring a second deviation $D_2$ in the thickness of said strip relative to a predetermined reference thickness, and making a second correction $C_2$ in said spacing in accordance with a predetermined relationship $$C_2 = \left(\frac{D_2}{D_1 - D_2}\right) C_1$$

2. The method of controlling the thickness of a moving strip of material, including the steps of making a first deviation measurement $D_1$ of the thickness of said strip relative to a predetermined reference thickness $D_0$, making a first correction $C_1$ in the thickness of said strip according to the relationship $(K \times D_1)$, where K is a constant having a predetermined value, making a second deviation measurement $D_2$ of the thickness of said strip relative to said predetermined reference thickness $D_0$, and making a second correction $C_2$ in the thickness of said strip in accordance with the relationship $$C_2 = \left(\frac{D_2}{D_1 - D_2}\right) C_1$$

such that said strip is thereby provided with a thickness substantially corresponding to said predetermined reference thickness $D_0$.

3. The method of controlling the thickness of a moving strip of material, including the steps of measuring a first deviation $D_1$ in the thickness of said strip relative to a predetermined reference thickness, making a first correction $C_1$ in the thickness of said strip proportional to said first deviation $D_1$, measuring a second deviation $D_2$ in the thickness of said strip relative to said predetermined reference thickness, and making a second correction $C_2$ in the thickness of said strip substantially in accordance with the predetermined relationship $$C_2 = \left(\frac{D_2}{D_1 - D_2}\right) C_1$$

4. In control apparatus for a strip rolling mill including a pair of roller members operative with a moving strip for controlling the thickness of said strip, with said rolling mill including a motor operative to control the spacing between said roller members, the combination of strip thickness sensing means operative with said strip to provide a first control signal proportional to the thickness of a first portion of said strip and a second control signal proportional to the thickness of a second portion of said strip, a control device operative with said motor and connected to said strip thickness sensing means to be initially responsive to said first control signal to provide an initial correction in the spacing between said roller members, and time control apparatus operative with said control device for causing said control device to be subsequently responsive to said first and second control signals and to said initial correction for providing a subsequent correction in the spacing between said roller members.

5. In control apparatus for a strip rolling mill including a pair of roller members operative with the strip for controlling the thickness of said strip, with said mill including a motor for controlling the spacing between said roller members, the combination of a strip thickness sensing device operative with said strip to provide a first control signal proportional to a first deviation of the strip thickness relative to a predetermined reference thickness and a predetermined time interval later to provide a second control signal proportional to a second deviation of the strip thickness relative to said predetermined reference thickness, a strip thickness control device operative with said motor and connected to said strip thickness sensing device to be responsive to said first control signal for making a first change in the spacing between said roller members, and a timing control device operative with said strip thickness control device for causing said strip thickness control device to be operative subsequent to said predetermined time interval to make a second change in the spacing between said roller members in accordance with a predetermined relationship between said first and second control signals and said first change in said roller member spacing.

6. In control apparatus for a machine device including a first work member and a second work member operative with a moving workpiece for controlling the thickness of said workpiece, the combination of a first control device operatively connected to at least one of said work members for controlling the spacing between said work members, a workpiece thickness sensing device operative with said workpiece and spaced a predetermined distance relative to one of said work members, a timing control device operative with said sensing device for causing said sensing device to provide a first control signal in accordance with the thickness of a first portion of said workpiece and after a predetermined time interval dependent upon the movement speed of said workpiece for providing a second control signal in accordance with the thickness of a second portion of said workpiece, and a second control device operative with said first control device and connected to said sensing device to be responsive to said first control signal for effecting a first amount of change in the spacing between said work members proportional to said first control signal, with said second control device being operative with said timing control device and responsive to said first and second control signals and said first amount of change for effecting a second amount of change in the spacing between said work members proportional to a predetermined relationship between said first and second control signals and said first amount of change in the spacing between said work members.

7. In control apparatus for a strip rolling mill including a pair of roller members operative with a moving strip for controlling the thickness of said strip, the combination of strip thickness control means operative with at least one of said roller members for controlling the spacing between said roller members, time control means operative with said strip and responsive to the movement speed of said strip, strip thickness sensing means operatively connected to said time control means and operative with said strip for providing a first control parameter as a function of a first error in the strip thickness relative to a predetermined reference strip thickness and for providing after a time interval dependent upon the movement speed of said strip a second control parameter as a function of a second error in the strip thickness relative to a predetermined reference strip thickness, with said strip thickness control means being operative with said strip thickness sensing means and responsive to said first control parameter for effecting a first change in the thickness of said strip proportional to said first control parameter, and with said strip thickness control means being operatively connected to said time control means and after said time interval being responsive to said first and second control parameters and said first change in said strip thickness for effecting a second change in the thickness of said strip proportional to a predetermined relationship between said first and second parameters and said first change in strip thickness.

8. In control apparatus for a strip rolling mill including a pair of roller members operative with a moving strip for controlling the thickness of said strip, the combination of strip thickness control means operative with at least one of said roller members for controlling the spacing between said roller members, time control means operative with said strip and responsive to the movement speed of said strip, strip thickness sensing means operative with said strip and operative with said time control means for providing a first control parameter $D_1$ as a function of a first error in the strip thickness relative to a predetermined reference thickness and for providing after a time interval dependent upon the movement speed of said strip a second control parameter $D_2$ as a function of a second error in the strip thickness relative to a predetermined reference strip thickness, with said strip thickness control means being operatively connected to said sensing means and responsive to said first control parameter $D_1$ for effecting a first change $C_1$ in the thickness of said strip proportional to said first control parameter $D_1$, and with said strip thickness control means being operative with said time control means and responsive to said first control parameter $D_1$, said second control parameter $D_2$ and said first change $C_1$ for effecting a second change $C_2$ in the thickness of said strip in accordance with the predetermined relationship $$C_2 = \left(\frac{D_2}{D_1 - D_2}\right) C_1$$

9. In control apparatus for a machine device including a first work member and a second work member operative with a moving workpiece for controlling the thickness of said workpiece, with said device including a motor operatively connected to at least one of said work members for controlling the spacing between said work members, the combination of a sampling device operative with said workpiece for providing a plurality of successive sampling periods having a time duration proportional to the movement speed of said workpiece, a thickness measuring device operative with said workpiece and operatively connected to said sampling device for providing a first control signal during a first of said sampling periods and having a value proportional to a first deviation of the thickness of said workpiece relative to a predetermined reference thickness, a strip thickness control device connected to said measuring device and responsive to said first control signal and operative with said motor to provide a first variation in the spacing between said work members in accordance with the value of said first control signal, a first register device operative with said thickness measuring device for providing a first output signal in accordance with said first control signal, a second register device operative with said strip thickness control device for providing a second output signal in accordance with said first variation, with said thickness measuring device being operative during a second of said sampling periods to provide a second control signal having a value proportional to a second deviation of the thickness of said workpiece relative to said predetermined reference thickness, and with said strip thickness control device being operatively connected to said sampling device and responsive to said second control signal, said first output signal and said second output signal for providing a second variation in the spacing between said work members in accordance with a predetermined relationship between said second control signal, said first output signal and said second output signal.

References Cited in the file of this patent

UNITED STATES PATENTS

| | | |
|---|---|---|
| 2,264,096 | Mohler | Nov. 24, 1941 |
| 2,660,077 | MaCaulay et al. | Nov. 24, 1953 |
| 2,708,254 | MaCaulay et al. | May 10, 1955 |
| 2,710,934 | Senn | June 14, 1955 |
| 2,851,911 | Hessenberg | Sept. 16, 1958 |
| 2,883,895 | Vossberg | Apr. 28, 1959 |
| 2,909,717 | Hulls et al. | Oct. 20, 1959 |

FOREIGN PATENTS

| | | |
|---|---|---|
| 627,000 | Great Britain | July 25, 1949 |
| 1,114,501 | France | Dec. 19, 1955 |

OTHER REFERENCES

Control Engineering, September 1956, pages 116 and 117.